(12) United States Patent
Keene et al.

(10) Patent No.: US 9,170,124 B2
(45) Date of Patent: Oct. 27, 2015

(54) VARIABLE STEP TRACKING

(75) Inventors: Richard M. Keene, Park City, UT (US); Stephen Kent Garland, Salt Lake City, UT (US); Milne T. Crouch, West Jordan, UT (US); Daniel Travis Maxwell, Salt Lake City, UT (US); Daniel C. Maxwell, West Valley City, UT (US)

(73) Assignee: SEER TECHNOLOGY, INC., Salt Lake City, UT (US)

( * ) Notice: Subject to any disclaimer, the term of this patent is extended or adjusted under 35 U.S.C. 154(b) by 829 days.

(21) Appl. No.: 13/236,522

(22) Filed: Sep. 19, 2011

(65) Prior Publication Data

US 2012/0239333 A1   Sep. 20, 2012

Related U.S. Application Data

(60) Provisional application No. 61/384,141, filed on Sep. 17, 2010.

(51) Int. Cl.
 *G01C 22/00* (2006.01)
(52) U.S. Cl.
 CPC .................................. *G01C 22/006* (2013.01)
(58) Field of Classification Search
 CPC .... G01C 22/006; G01C 22/00; A43B 3/0005; Y10S 482/902; Y10S 482/91
 See application file for complete search history.

(56) References Cited

U.S. PATENT DOCUMENTS

| | | | | |
|---|---|---|---|---|
| 4,771,394 | A | * | 9/1988 | Cavanagh ...................... 702/160 |
| 6,009,375 | A | * | 12/1999 | Sakumoto et al. ............. 701/469 |
| 6,307,475 | B1 | | 10/2001 | Kelley |
| 6,424,264 | B1 | | 7/2002 | Giraldin et al. |
| 6,813,582 | B2 | | 11/2004 | Levi et al. |
| 2002/0026282 | A1 | | 2/2002 | Turetzky |
| 2004/0059502 | A1 | * | 3/2004 | Levi et al. ...................... 701/224 |
| 2004/0070515 | A1 | | 4/2004 | Burkley et al. |
| 2004/0085209 | A1 | | 5/2004 | Schmidt et al. |
| 2004/0230374 | A1 | | 11/2004 | Tzamaloukas |
| 2005/0017899 | A1 | | 1/2005 | Cervinka et al. |
| 2005/0033515 | A1 | | 2/2005 | Bozzone |
| 2005/0092823 | A1 | | 5/2005 | Lupoli et al. |
| 2005/0137786 | A1 | | 6/2005 | Breed |
| 2005/0240345 | A1 | | 10/2005 | Yamamoto |

(Continued)

FOREIGN PATENT DOCUMENTS

| | | |
|---|---|---|
| JP | 2000/097722 | 4/2000 |
| KR | 10-0947117 | 3/2010 |

OTHER PUBLICATIONS

U.S. Appl. No. 12/709,003, filed Feb. 19, 2010; Paul Losee; Office Action issued Oct. 19, 2011.
U.S. Appl. No. 13/236,521, filed Sep. 19, 2011; Richard M. Keene.
U.S. Appl. No. 12/709,003, filed Feb. 9, 2010; Paul Losee; office action issued Feb. 21, 2012.

(Continued)

*Primary Examiner* — Mischita Henson
(74) *Attorney, Agent, or Firm* — Thorpe North & Western LLP

(57) ABSTRACT

Variable step tracking is described in which a monitoring station is operable to receive data signals representative of step movement of an asset as detected by a monitoring device carried by the asset. A database stores a step length of the asset. A step length modification module modifies the step length based on at least one of energy, asset orientation, direction, and frequency associated with the step movement. An asset position is estimated with respect to a known location based on cumulative step lengths.

22 Claims, 14 Drawing Sheets

(56) References Cited

U.S. PATENT DOCUMENTS

| | | |
|---|---|---|
| 2005/0289162 A1 | 12/2005 | Saitta |
| 2006/0064276 A1* | 3/2006 | Ren et al. ................ 702/160 |
| 2006/0262120 A1 | 11/2006 | Rosenberg |
| 2006/0277474 A1 | 12/2006 | Robarts et al. |
| 2007/0008099 A1 | 1/2007 | Kimmel et al. |
| 2007/0213927 A1 | 9/2007 | Ishigami et al. |
| 2007/0250261 A1 | 10/2007 | Soehren |
| 2008/0077326 A1 | 3/2008 | Funk et al. |
| 2008/0275348 A1* | 11/2008 | Catt et al. ................ 600/483 |
| 2009/0043504 A1 | 2/2009 | Bandyopadhyay et al. |
| 2010/0121572 A1 | 5/2010 | Berardi et al. |
| 2010/0214118 A1 | 8/2010 | Losee |
| 2010/0218101 A1 | 8/2010 | O'Shaughnessy et al. |
| 2012/0239332 A1 | 9/2012 | Keene |

OTHER PUBLICATIONS

U.S. Appl. No. 12/709,003, filed Feb. 19, 2010; Paul Losee; office action dated Dec. 17, 2013.

PCT Application PCT/US2010/052227; filing date Sep. 19, 2011; Stephen Kent Garland; International Search Report mailed May 7, 2012.

PCT Application PCT/US2011/052228; filing date Sep. 19, 2011; Stephen Kent Garland; International Search Report mailed May 7, 2012.

U.S. Appl. No. 13/236,521, filed Sep. 19, 2011; Richard M. Keene; office action dated Aug. 8, 2014.

U.S. Appl. No. 12/709,003, filed Feb. 19, 2010; Paul Lossee; office action dated Aug. 27, 2014.

\* cited by examiner

VARIABLE STEP TRACKING

PRIORITY CLAIM

Priority is claimed to U.S. Provisional Patent Application Ser. No. 61/384,141 filed on Sep. 17, 2010, which is incorporated herein by reference in its entirety.

RELATED APPLICATIONS

This application is related to U.S. patent application Ser. No. 12/709,003 filed on Feb. 19, 2010, the entire contents of which are incorporated herein by reference.

This application is related to U.S. patent application Ser. No. 13/236,521 filed on Sep. 19, 2011, the entire contents of which are incorporated herein by reference.

BACKGROUND

The ability to accurately track and locate personnel can be valuable to a mission's success or failure. Mission commanders leading an emergency response team, for example, are often limited in the ability to determine where critical assets are located, including human assets that have been dispatched into the field. Certain technologies have been developed that can enable tracking of assets. These technologies are typically reliant on continuous radio frequency communications. For example, global positioning satellite (GPS) systems and other types of triangulation systems can be used to determine a location of an asset based on the timing of radio signals received at the asset location. The ability to track assets using radio frequency signals has greatly improved a commander's ability to track and locate desired assets.

However, in many types of emergencies, radio frequency communications can be spotty. Tornadoes, hurricanes, and earth quakes can often destroy power and communications infrastructure, thereby reducing the ability to use land based communications and radio frequency triangulation systems. Buildings and storms can impede radio frequency signals to the point where GPS systems can be useless. Thus, over reliance on tracking devices that rely on continuous radio frequency communications can actually impede progress in an emergency response when the tracking devices cease to function properly due to the environment of the emergency location.

SUMMARY

Variable step tracking is described in accordance with an example in which a monitoring station is operable to receive data signals representative of step movement of an asset as detected by a monitoring device carried by the asset. A database stores a step length of the asset. A step length modification module modifies the step length based on at least one of energy, asset orientation, direction, and frequency associated with the step movement. An asset position is estimated with respect to a known location based on cumulative step lengths.

A method for variable step tracking is provided in accordance with an example. The method includes measuring a step length of an asset, such as a human asset. The asset can be positioned at a known location. Step movement of the asset with respect to the known location can be calibrated to determine movement direction and distance. Step movement of the asset can be detected using a movement detection device. Positional or other data of the step movement can be logged as a function of time. The step length can be modified based on at least one of energy, asset orientation, direction, and frequency associated with the step movement. An asset position can be estimated with respect to the known location based on cumulative step lengths.

In accordance with an example, a non-transitory computer readable storage medium having computer readable instructions embodied therein which, when executed by the processor, are operable to: measure a step length of an asset; position the asset at a known location; detect step movement of the asset using a movement detection device; log positional or other data of the step movement as a function of time; and modify the step length based on at least one of energy, asset orientation, direction, and frequency associated with the step movement.

DETAILED DESCRIPTION

Figure 1:
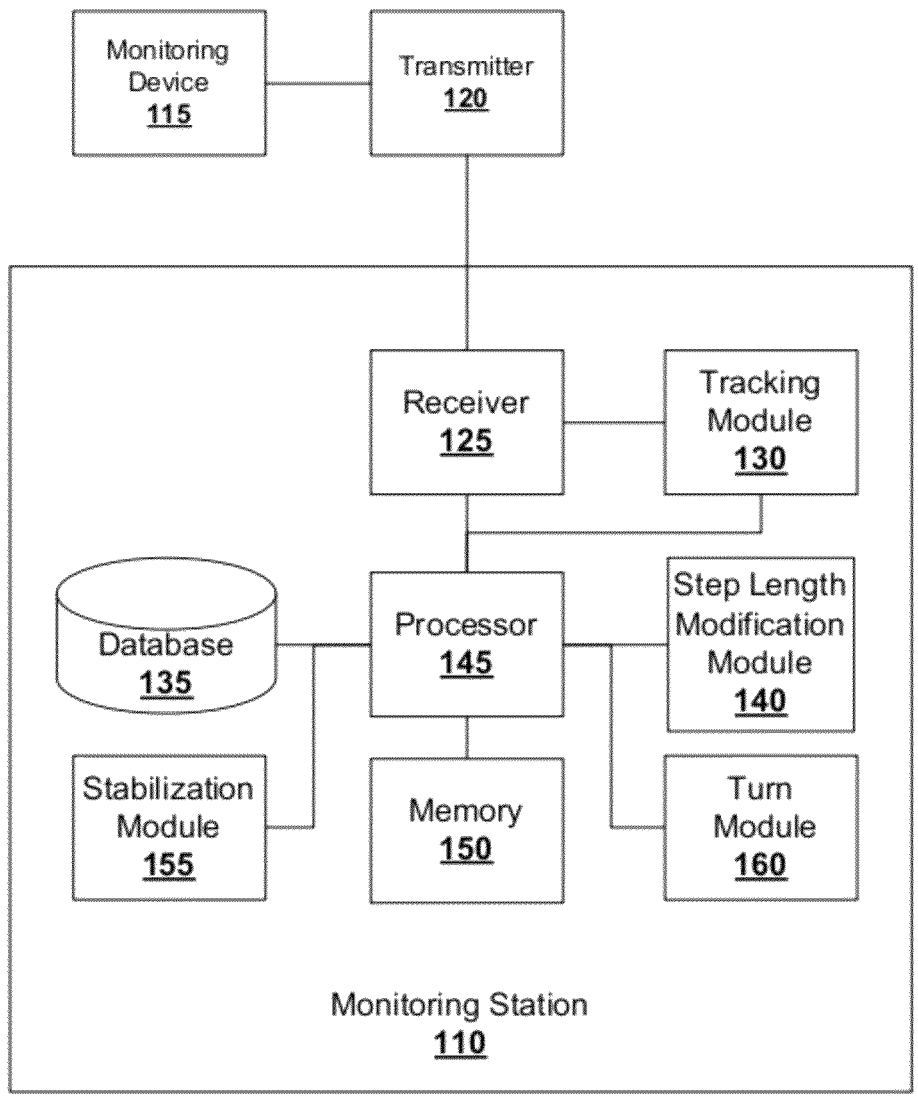
FIG. 1 is a block diagram of a system for variable step tracking in accordance with an example of the present technology.

Before the present disclosure is described herein, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

The following terminology will be used in accordance with the definitions set forth below.

As used herein, the singular forms "a," and, "the" include plural referents unless the context clearly dictates otherwise.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Example Embodiments

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth in the Summary above, it is noted in the present disclosure that when describing the system, or the related devices or methods, individual or separate descriptions are considered applicable to one other, whether or not explicitly discussed in the context of a particular example or embodiment. For example, in discussing the movement tracking and/or correction per se, the device, system, and/or method embodiments are also included in such discussions, and vice versa.

Furthermore, various modifications and combinations can be derived from the present disclosure and illustrations, and as such, the following figures should not be considered limiting.

The ability to accurately track human assets involved in emergency missions and other first response scenarios can significantly enhance a mission leader's ability to make decisions that will increase the probability of success of the mission. However, the leader's decisions are only as good as the data provided. If radio frequency tracking equipment that is relied on to track human assets provides inaccurate data, or worse, no data at all, the reliance on the tracking equipment can have a negative effect on the outcome of the mission.

As previously discussed, asset tracking in emergency situations using radio frequency tracking equipment may not be reliable, especially in disaster situations such as tornadoes, flooding, hurricanes, and war time situations. The destruction of land based infrastructure may reduce or eliminate signals needed to allow the tracking equipment to work. For example, the tracking equipment may be reliant on land based cellular telephone transmitters to provide tracking of assets based on triangulation of radio frequency signals. The cellular telephone transmitters can be destroyed or disrupted by power failures in natural disasters, thereby reducing their reliance. GPS systems can prove more robust in a disaster area due to their use of space based satellite signals for use in triangulation. However, since the GPS signals are sent from satellites located thousands of miles away, the signal power received at a GPS receiver is quite low, thereby providing a significant probability that the signal may be lost in urban areas, within buildings, during a severe storm, and so forth.

Even a brief disruption can be unacceptable in certain situations. For example, in a high rise building fire it can be critical to know where each emergency responder is located in the event that the responders need to be evacuated. Many of the responders may be positioned in locations within the building that are not amenable to receiving and transmitting radio frequency signals. Thus, positional awareness of each emergency responder's location cannot be accomplished by relying on radio frequency communications alone.

In order to increase the reliability of asset tracking in first responder, emergency, and security situations, one or more backup systems can be used to supplement information obtained through radio frequency tracking. More specifically, deduced reckoning techniques can be used to supplement the radio frequency tracking of human assets to provide substantially accurate positional information to enable mission commanders to make more informed decisions in time critical situations. One time of deduced reckoning technique is inertial navigation.

One example of an inertial navigation system can include directional sensors including a digital magnetic compass that can be used to determine a direction of the person's movement. One or more accelerometers can be used to measure a person's stride and the number of steps that are taken. At least one magnetometer can be used to reduce the effect that external magnetic fields or ferromagnetic materials near the system can have on the output of the compass. An altimeter such as a barometric altimeter can be used to measure altitude, which can be critical in locating a person in a building, on a mountain, or another type of a three dimensional environment. One or more gyroscopes can also be used to increase a positional accuracy of the deduced reckoning system. In one embodiment, a separate gyroscope, magnetometer, and accelerometer can be positioned in three mutually orthogonal axes to enable precise measurements of a person's movement in each of these three directions. An inertial navigation system is more fully disclosed in copending U.S. patent application Ser. No. 12/709,003 filed on Feb. 19, 2010, which is herein incorporated by reference in its entirety.

Referring now to FIG. 1, a block diagram is illustrated of a system for tracking a person in a building, in accordance with an example of the present technology. The system includes a monitoring station 110 operable to receive data signals representative of positional data of step movement of an asset as detected by a monitoring device 115 carried by the asset. A database 135 stores a step length of the asset. A step length modification module 140 modifies the step length based on at least one of energy, asset orientation, direction, frequency, and positional data associated with the step movement. An asset position is estimated with respect to a known location based on cumulative step lengths using a processor 145. A tracking module 130 can track the movement of the person by estimating a location of the person from the data signals received from the monitoring device 115.

The tracking system may be operated from a monitoring station 110. The monitoring station may be located in a vehicle, building, tent, or other permanent or temporary, fixed or movable structure. The monitoring station may be used to track one or more people or assets, assets including human beings, animals (such as a rescue dog), robots, etc. In the context of this disclosure, an asset is typically capable of multi-pedal movement, such as bipedal or quadrupedal movement for example. However, other forms of movement such as crawling, rolling, slithering, and so forth may also be accounted for and corrected to display a substantially accurate path and location of the tracked asset.

The person or asset being tracked can carry a monitoring device 115. The monitoring device can be attached to equipment carried by the asset or can be attached to the asset or clothing worn by the asset. For example, the monitoring device may be attached around a torso of the asset or may be attached to an SCBA (self contained breathing apparatus) tank. The monitoring device can be operable to detect various positional and environmental data or other aspects related to the movement of the person. For example, the monitoring device can detect a plurality of directions of the movement, such as forward, backward, sideward, upward, or downward directions or angles. The monitoring device can include an inertial measurement unit, an accelerometer, a barometer, a digital compass and/or magnetometer, a gyroscope, or any combination of these devices. In some examples, the monitoring device can include a global positioning system (GPS) device in combination with the aforementioned monitoring devices. The positional data relayed by the GPS can be supplemented by the monitoring devices, especially when the GPS data cannot be reliably received or relayed by the monitoring device.

The monitoring device 115 can be coupled to a transmitter 120. The transmitter can be configured to transmit data signals, as obtained from the monitoring device, to a receiver 125 at the monitoring station 110. The data signals can include the detected positional data of the person. In one example, the data signals can further include time stamps associated with the positional data. The positional data can often be associated with a person's steps or other movements/positions. For example, the monitoring device can detect whether a person is upright or prone. The steps can be monitored by the measurement devices in the monitoring device, such as the accelerometer and gyroscope. This information can be used in calculating step frequency and step length, which can be combined with other information to approximate a location of the asset.

The transmitter 120 and receiver 125, while primarily described in terms of a unidirectional communication link, may each comprise transceiver devices capable of both transmitting and receiving data, and thus may form a bidirectional communication link. Communication between the transmitter and receiver may be wired or wireless. In many applications, wireless communication may provide more freedom of movement and have various advantages over wired communications. The communication may be performed using any known, suitable technologies or protocols. Some non-limiting examples of wireless technologies include Wi-Fi (IEEE (Institute of Electrical and Electronics Engineers) 802.11a, b, g, or n), Global System for Mobile Communications (GSM), Code Division Multiple Access (CDMA), General packet radio service (GPRS), Wideband Code Division Multiple Access (W-CDMA), Enhanced Data rates for GSM Evolution (EDGE) or CDMA2000, ZigBee, Bluetooth, IEEE 802.16, commonly referred to as Worldwide Interoperability for Microwave Access (WiMAX), Third Generation Partnership Project (3GPP) Long Term Evolution (LTE), satellite communications, and so forth.

As described above, as the person moves within or around a building, the monitoring device 115 carried by the person detects the movement of the person and transmits the detected information as data signals to the monitoring station 110. The detected information can include location information in three orthogonal dimensions (i.e. x, y, and z axes) that is collected at a predetermined rate as a person moves. The data signals can be stored in a database 135 or memory 150 and can be used to approximate a path or position of the person. This path or position may be represented tabularly, graphically, or in another desired format at the monitoring station, and may be presented on a display device to a monitoring attendant. In one embodiment, the graphical display can also be communicated to the asset in conjunction with a map of the location of the asset, such as the building. This map can be used by the asset to determine their location inside the building. The database can store an energy level associated with a step of the asset. The energy level of each person's step can be measured and stored. In one example, the energy level can be derived from a brisk walk energy level. The energy level for other types of movement can be measured as well and can be representative of at least one type or mode of movement comprising at least one of walking, running, and crawling of the asset. It has been experimentally determined that when a single measurement is used for determining multiplicative factors on which stride length is based for different movement modes, the brisk walk measurement provides a more accurate standard from which to base the multiplicative factors for the other modes of movement. Multiplicative factors will be described in additional detail below.

The system can include a tracking module 130 configured to track the movement of the person by estimating a location of the person from the data signals. As an example, a number of steps in a detected direction can be combined with an actual detected, estimated, or calculated step length of the person to determine approximately how far the person has moved and in what direction. In one aspect, such tracked movement can be aligned with a building or geographical layout to accurately represent movement of the person with respect to the building or the geography.

The system can include a stabilization module 155. As will be described further below, steel beams and the like can skew output from a magnetic compass, which could lead to inaccurate tracking. Therefore, in one example, where the monitoring device includes a compass and a gyroscope, the gyroscope can be used to stabilize an output from the compass. Devices such as gyroscopes can drift over time and require correction. Therefore, in one example, the gyroscope output can be stabilized using a compass output or a building orientation or wall of the building to correct for the drift. As another example, the stabilization module can operate to estimate an asset position with respect to a known location based on an average trajectory when the monitoring device, such as a gyroscope, resets and is temporarily unable to detect movement.

The system can include a turn module 160 configured to correct for inaccuracies in monitoring devices when the asset turns or changes direction of movement. Turn correction will be described in further detail below.

The system can further include one or more processors 145, random access memory (RAM) and non-volatile memory 150, I/O buses, and other components for use by the various modules in performing the described functionality of the modules. In one aspect, the system memory can include program instructions that when executed by the processor function as the modules described above.

In some examples, a system and/or method can be implemented using the memory 150, processor 145, and/or computer readable medium. For example, an article of manufacture can include a memory or non-transitory computer usable storage medium having computer readable program code or instructions embodied therein for tracking an asset and comprising computer readable program code capable of performing the operations of the methods described. In another example, the memory can include portable memory containing installation files from which software can be installed or remote memory from which installation filed can be downloaded. Also, program instructions stored in the memory can be embodied in installation files or installed files.

Figure 2:
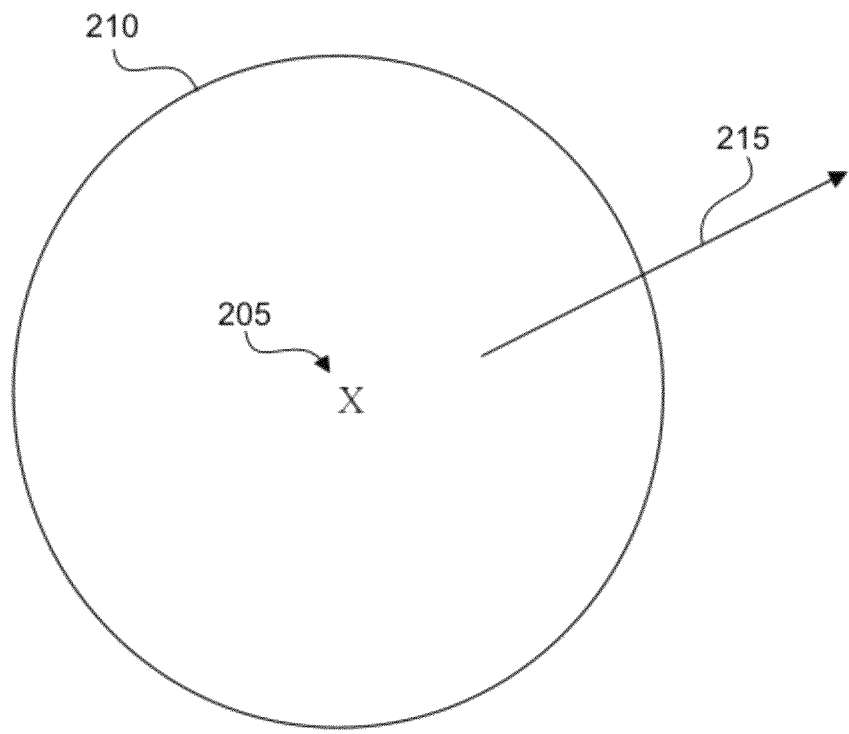
FIG. 2 illustrates a method of step tracking.

When performing inertial navigation, correction can be made for various errors in the system. If the correction is not made, the errors may continue to accumulate until the results have an undesirable level of error. One method that has been used in previous systems is to use a known step length to restrict the solution space. In other words, if a system has a recorded position of an individual, the system can estimate a next position of the individual after taking a step based on the known step length. This method works by knowing where the individual is and by knowing that the next solution must lie on a circle around the location. Referring to FIG. 2, X 205 represents the location of the person at the current time. The circle 210 represents one step from the current location. From this methodology all solutions to the next location lie on the circle. If the arrow 215 represents a set of possible solutions based on compass, gyroscope, or other measurements, the point where the arrow and the circle intersect is the new estimated point.

Previous systems operating in this manner are functional but include various limitations. For example, step lengths are not actually constant. When a person walks up and down inclines, goes up stairs, etc., the person's step length will change. Except for the single case where the person is walking in a straight line on level ground, the prior art assumptions are violated and the step estimation is inaccurate. As another example, step lengths can be modified by physical constraints. The use of stairs, for example, may impose a standard step length on the stride based on the width and/or height of the stairs. Step lengths can vary by changes in walking patterns. For example, step lengths will vary as a person walks backward, sidewise, crawls, etc.

Limitations of prior systems can be addressed in a variety of ways. For example, step length can be modified by an indication of vertical movement. The indication of vertical movement can be based on accelerometer readings, barometric readings, etc. The speed of elevation change can also be useful. Based on the elevation change, a correction factor can be determined based on a standard stride length. The standard stride length can be obtained by measuring a person's stride digitally (e.g., using a computer or other electronic device) or physically (e.g., using a tape measure).

Figure 3:
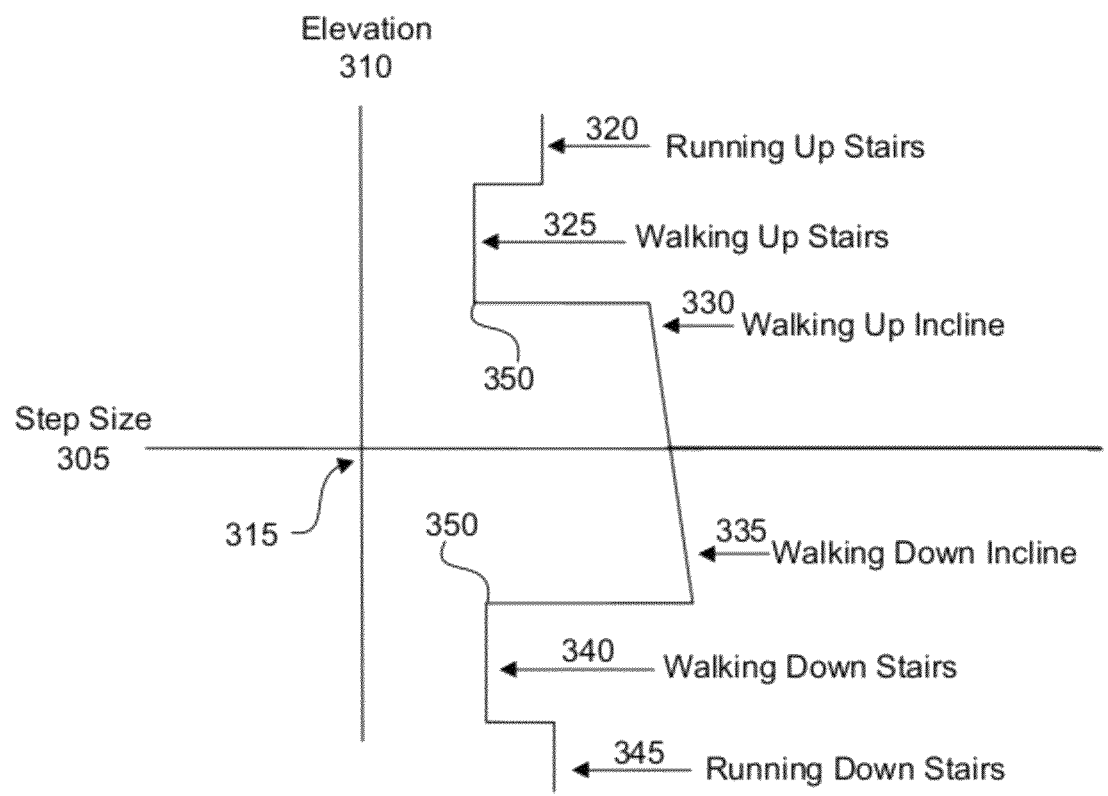
FIG. 3 is a graph of step tracking based on a rate of change in elevation in accordance with an example of the present technology.

The correction of stride length can be accomplished by the step length modification module 140 mentioned above regarding FIG. 1 using a model or graph. Referring to FIG. 3, a graph is shown which illustrates an example correction factor for step length based on incline. The horizontal axis 305 represents a step size, where points farther to the right of the origin 315 represent a larger step size, or a larger stride. The vertical axis 310 represents a rate of change in elevation, or a change in elevation per stride. As described above, the rate of change in elevation can be measured using barometers, accelerometers, and the like. The standard stride length is represented as where the varying stride length line crosses the horizontal axis. As shown, a stride length decreases when walking up an incline 330 and increases when walking down an incline 335. A stride length may decrease abruptly when a person goes up a stair or set of stairs 325. When the person is running up the stairs 320, the person is often going up two stairs at a time, and thus the stride length increases over the stride length of walking up the stairs. Likewise, a stride length may decrease abruptly when a person goes down a stair or set of stairs 340. When the person is running down the stairs 345, the person is often going down two stairs at a time, and thus the stride length increases over the stride length of walking down the stairs.

In FIG. 3, the horizontal axis 305 representing the stride length in distance can be the X axis. The vertical axis 310 representing the rate of change in elevation can be the Y axis. There is a slope (e.g., 320, 325, 330, 335, 340, 345) to correct the stride length based on rate of change of elevation. The correction may be depicted as a straight line for a specific mode of movement (e.g., running, walking, etc.), but the correction can be depicted in any other suitable manner. Also, the sharp edges 350 in FIG. 3 may be rounded. The stride length correction diagram of FIG. 3 is illustrative of how corrections can be made based on a rate of change in elevation and known variations in stride length with different rates of change. When the rate of change of elevation reaches a certain point, the correction can change to a stair climb mode or descend mode. In this case the stair may induce the person into a standard step length based on a depth and/or height of the stair. When relatively high rates of rising or descending are measured, it can be determined that the person is typically running up or down steps and is taking two steps at a time. So the stride length can be calculated as double the stair length to accommodate the change in stride of the person.

Much of the data in FIG. 3 can be determined experimentally. The correction factor can be determined from experimental data illustrating specific sequences of stride versus elevation change to indicate whether a person is going up one stair, multiple stairs, an incline, etc. The stair lengths can be determined from standard stair measurements for the local area where the tracking is taking place. For example, local building codes can be referenced to determine standard stair sizes.

Figure 4:
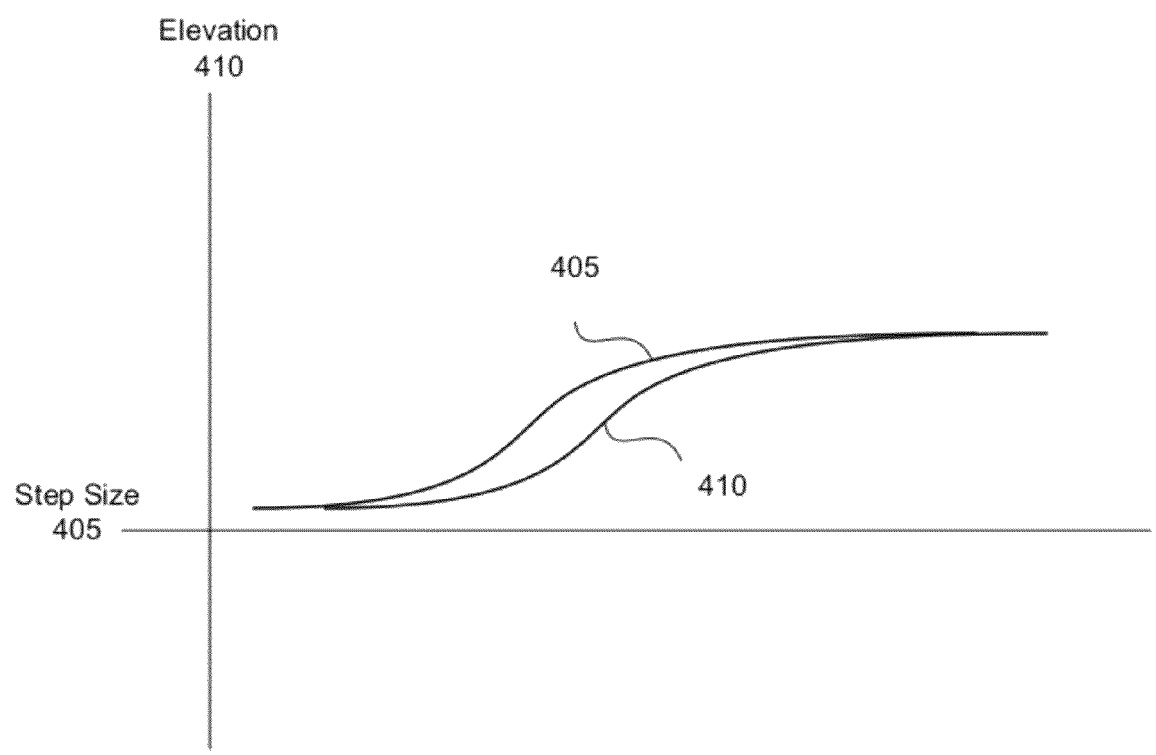
FIG. 4 is a graph of a time delay between actual change in elevation and detected change in elevation in accordance with an example of the present technology.

FIG. 4 illustrates a correction example involving stairs and/or inclines and makes assumptions that the person is either on an incline or a stair. There are other possible stepping modes which will be described in further detail below.

During a stair operation, the elevation can be monitored by steps (or movement in a forward, backward, or sideward direction), barometer or accelerometer readings, and a Y (vertical) acceleration. The acceleration can be noisy. As a result, the Y signal can be integrated to give vertical velocity.

To determine if the person is going up or down a stair a voting scheme can be used. First, a determination is made as to whether barometer readings indicate the person is going upward in elevation. If yes, "up" receives a vote. Second, a determination is made as to whether accelerometer readings indicate the person is going upward in elevation based on vertical acceleration or velocity measurements. If yes, "up" receives a vote. Third, the first and second steps are repeated for downward elevation change. If the barometer and accelerometer readings produce conflicting votes, then no elevation change is assumed. If one or two votes are produced for "up" and no votes for "down", an upward elevation change can be recorded or assumed. If one or two votes are produced for "down" and no votes for "up", a downward elevation change can be recorded or assumed.

In other variations, a single vote may be taken. In this example, either the barometer or velocity readings can control all decisions as to elevation change. Also, the scheme can be modified to include more than two vertical sensors, or vertical sensors other than accelerometers and/or barometers may be used.

There is often a delay between the time when an elevation change actually occurs and when a barometer responds and/or indicates the elevation change. The delay is typically on the order of 3 to 5 seconds and may vary depending on the barometer used. Referring to FIG. 4, the graph shown illustrates an actual change in elevation (represented by the top line 410, or the first line to go upward) as compared with a measured change in elevation (the second, or bottom line 415). The horizontal axis 415 represents time and the vertical axis 420 represents elevation. For example, the actual change may be 3.5 seconds sooner in time than the measured change. To synchronize the velocity and barometer readings to correct for the barometer delay, the velocity signal can be slowed down using a First In First Out (FIFO) buffer. The steps are placed in and removed when 1. the buffer is full; and
2. the delay time is reached (about 3 to 5 seconds).

In addition changes in stride with elevation change, there are different step lengths which vary based on a stepping or movement mode. Some example, movement modes include:

1. walking
2. running
3. climbing (rope, walls, etc.)
4. duck walking
5. being dragged
6. dragging someone
7. rolling
8. crouching
9. crawling The above list of movement modes is not exhaustive and other modes are also possible and contemplated. A step length changes for each different mode of movement. In some cases step length becomes an undefined quantity, such as when a person is being dragged. An accurate estimate of the movement mode is useful for providing a good estimate of the distance traveled. Thus, for example, when a person is being dragged, the movement of the dragged person can be estimated based on the person doing the dragging.

A table can be created for the different modes to include multiplication factors to adjust for and identify different movement modes. As an example, the table may appear as follows:

| | |
|---|---|
| Walk | 1.0 |
| Crouch walk | 0.9 |
| Side step | 0.9 |
| Back Step | 0.8 |
| Run | 1.7 |
| Crawl | 0.25 |

The table relates the stride length based on movement mode to the standard stride length. The table may include a further level of detail for each movement mode, identifying a multiplication factor for the movement mode based on whether the movement is on an inclined, declined, or level surface. In one aspect, there may be various multiplication levels for differing degrees of incline or decline of the surface. The multiplication factors can be experimentally derived for desired accuracy. Using the above table, if a user has a stride length of 700 mm, the back step will be about 0.8*700=560 mm. The multiplication factors may vary from individual to individual and/or may be set at other suitable values. Also, as with the list of movement modes, the multiplication factors and modes in the table are not inclusive. Other modes, multiplication factors, and correction factors can also be applied.

For the continuing discussion the following definitions will apply:

1. X is the accelerometer in the forward direction. This is the direction a person may be normally walking.
2. Y is a vertical accelerometer reading.
3. Z is acceleration perpendicular to X and Y (i.e., left or right acceleration).

Figure 5:
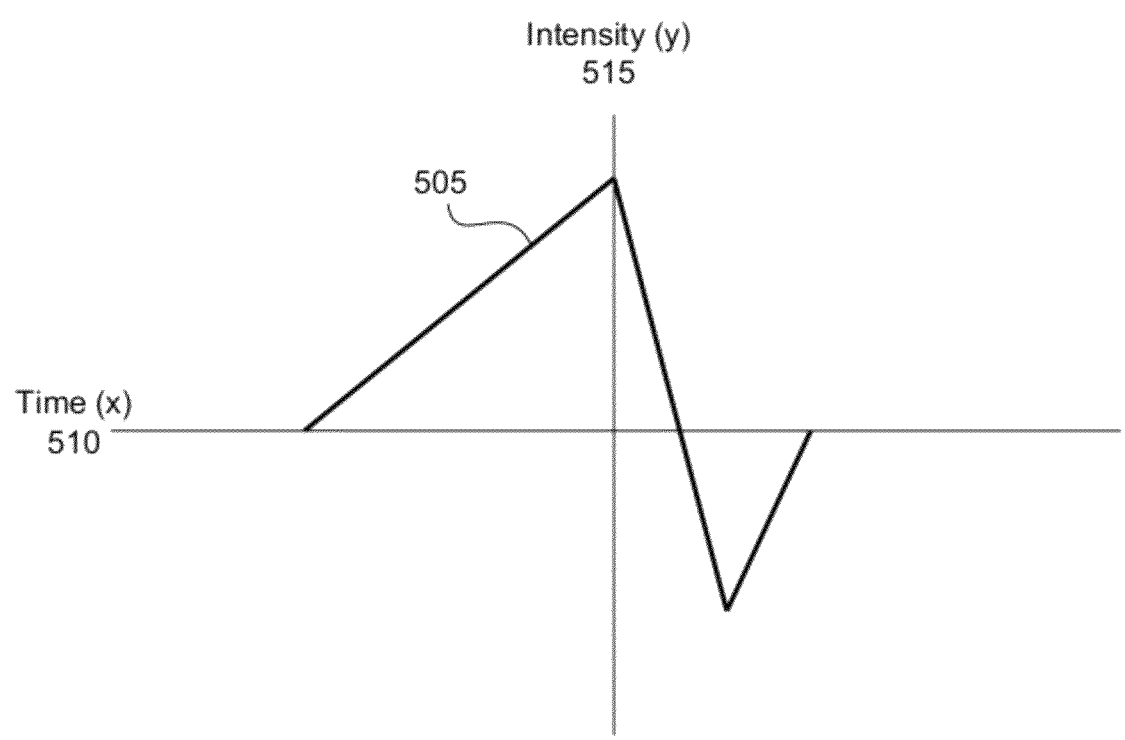
FIG. 5 is a graph of an extraction function in accordance with an example of the present technology.

Steps taken by a person can be identified using a wavelet or extraction function. FIG. 5 illustrates such a wavelet or extraction function 505. The extraction function can operate as a filter of data collected by the barometer and/or accelerometer to determine steps taken by a person over time. The x axis or horizontal axis 510 represents time and the y axis or vertical axis 515 represents signal intensity. The function is an asymmetrical function. A typical extraction function can be developed from the following wavelet code snippet:

```
/// <summary>
/// Max accel data value is +–16384 (0x4000) so wavlet values will
/// be scaled from ±1000.
/// Table is 64 entries, at 200 samples per second, thus .32 seconds which
/// is about a fast walk or slow run.
/// The center of the table has a slope from +1024 to 0 to –1024 so the
/// intervals between entries are slightly
/// non-integer. Also the lower index slope is steeper than the latter part as
/// this is how foot impact inertial data looks.
///
/// 16384 times 1000 is the maximum single item product, times 64 entries
// to sum is/ 1042176000 or just under
/// 0x40000000 and max int is 0x80000000 so we stay in range without
/// using floating point math.
/// </summary>
///
int wavlet[ ] = { 0, –36, –71, –106, –142, –177, –212, –248,
–283, –318, –354, –389, –424, –460, –495, –530,
–565, –601, –636, –671, –707, –742, –777, –813,
–848, –883, –919, –954, –989, –1024, –512, 0,
512, 1024, 989, 955, 921, 887, 853, 819,
785, 750, 716, 682, 648, 614, 580, 546,
512, 477, 443, 409, 375, 341, 307, 273,
238, 204, 170, 136, 102, 68, 34, 0
};
```

Figure 6A:
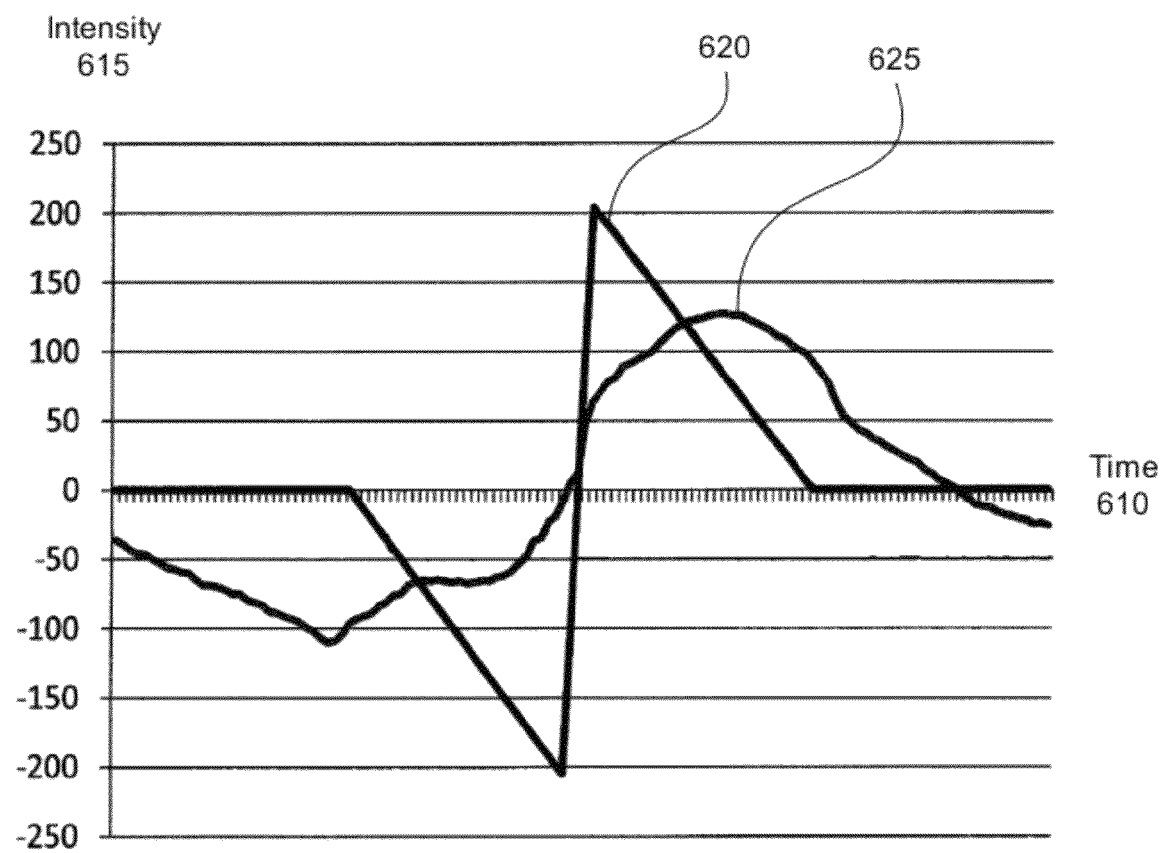
FIGS. 6a-6b are graphs of direction detection wavelets in accordance with examples of the present technology.

Referring to FIG. 6a, a plurality of wavelets are illustrated which can operate as filters of data collected by the barometer and/or accelerometer to determine a direction of steps taken by a person over time. As described above, factors such as step intensity, frequency, etc. can be used to determine whether a step is a side step, forward step, back step, etc. The horizontal axis 610 represents time and the vertical axis 615 represents signal intensity. A first wavelet 620 is fairly symmetrical and is based off of theoretical step intensities varying with time. A second wavelet 625 is similar to the first wavelet 620 in some aspects, but is an experimentally derived wavelet. The second wavelet was derived from compiled average data of a plurality of persons' step movement. An example extraction function can be developed from the following wavelet code snippet for the second wavelet:

```
// The step direction detector. First half is negative, second half is positive.
// Smoothed average of all forward walks.
const int stepForm[BM_TABLE_SIZE] = {
    -36, -39, -43, -46, -46, -50, -52, -56,
    -57, -59, -60, -65, -69, -69, -70, -72,
    -75, -75, -80, -81, -83, -88, -89, -91,
    -93, -95, -99, -102, -107, -110, -109, -104,
    -96, -93, -91, -89, -84, -81, -76, -75,
    -69, -67, -65, -66, -65, -66, -67, -66,
    -68, -67, -66, -66, -63, -62, -59, -53,
    -49, -37, -35, -23, -19, -8, 6, 13,
    48, 64, 71, 78, 81, 89, 91, 94,
    97, 100, 106, 111, 116, 119, 122, 123,
    124, 126, 127, 127, 126, 126, 123, 121,
    118, 115, 111, 109, 104, 101, 98, 91,
    84, 77, 64, 53, 49, 44, 41, 37,
    35, 31, 28, 25, 22, 20, 15, 12,
    7, 5, 2, -3, -6, -11, -12, -13,
    -16, -18, -19, -21, -22, -25, -24, -26
};
```

Figure 6B:
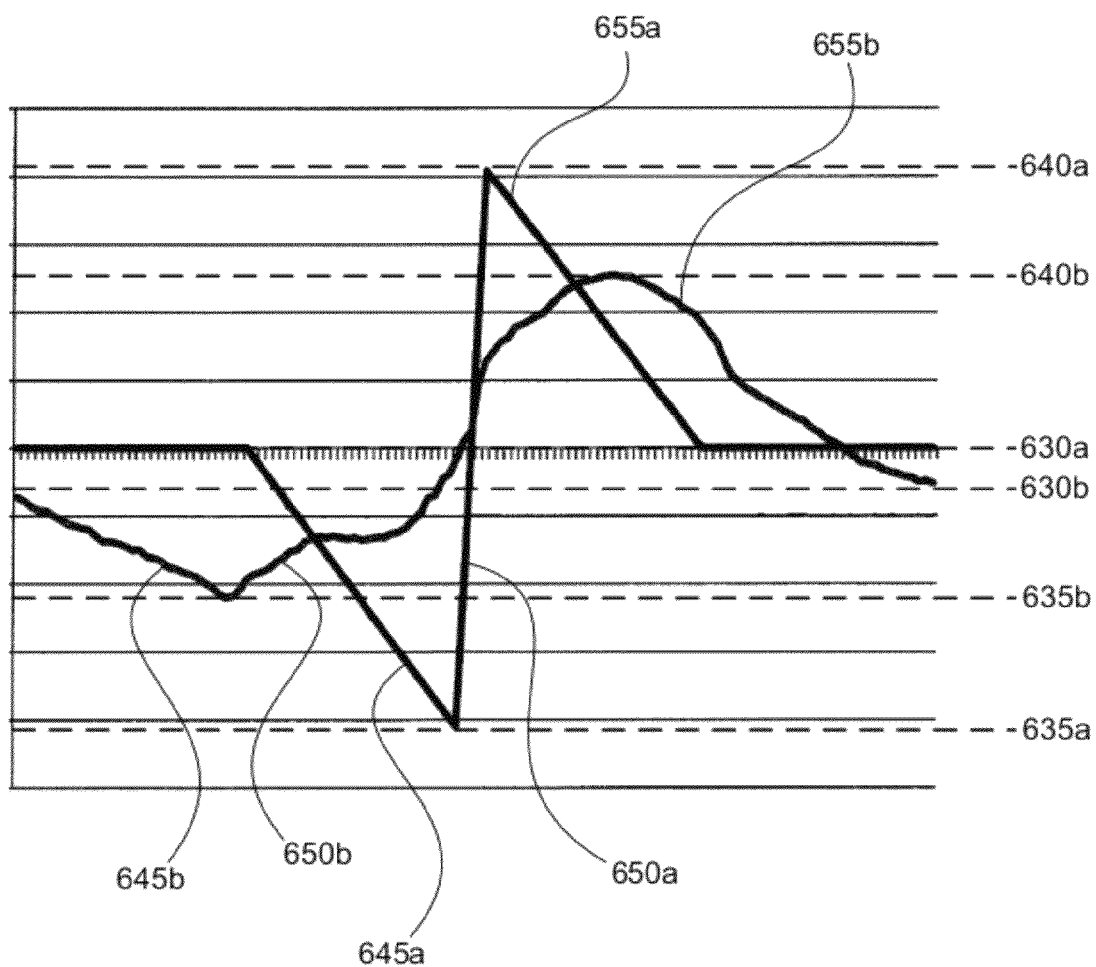

Use of wavelets or extraction functions can provide various advantages in step detection. Reference will now be made to FIG. 6b. Generically, the direction wavelets may be described as comprising a first amplitude 630a, 630b, a second amplitude 635a, 635b, and a third amplitude 640a, 640b. The second amplitude is a negative amplitude less than the first amplitude and the third amplitude is a greater amplitude than the first amplitude. The wavelets include first declined portions 645a, 645b declining from the first amplitude to the second amplitude, inclined portions 650a, 650b inclining from the second amplitude to the third amplitude, and second declined portions 655a, 655b declining from the third amplitude toward the first amplitude. Depending on the wavelet used, the first and second declined portions 645a, 655a and the inclined portion 650a may respectively comprise straight, linear segments, or the first and second declined portions 645b, 655b and the inclined portion 650b may respectively comprise non-linear segments.

The wavelet of FIG. 6b represents the front to back acceleration force of a step over the duration of one step. The wavelet can be understood as follows. Inclined portion 650a is the impact of the foot on the ground, which catches the person from falling over forward. The hill 655b is the forward leg decelerating the body, and then the trunk is carried on the forward leg in a smooth roll to where the forward leg becomes the back leg. Then the low peak at 650b is the push off of the back foot to move the trunk forward in to the next step. 655a is a more idealized version of the experimentally derived curve.

Wavelets can be defined to detect any of a variety of modes of movement, as well as intensity of movement, as has been described. The following code snippet is for a wavelet used to detect crawling motions and is convolved with a pitch gyroscope rate:

```
// Crawl detection wavelet. Convolved with Pitch Gyro rate.
const int crawlForm[BM_TABLE_SIZE] = {
    10, 10, 10, 10, 10, 10, 10, 10,
    20, 20, 20, 20, 20, 20, 20, 20,
    30, 30, 30, 30, 40, 40, 40, 40,
    50, 50, 50, 60, 60, 60, 70, 70,
    80, 80, 80, 80, 80, 80, 80, 80,
    80, 80, 80, 80, 80, 80, 80, 80,
    80, 70, 60, 50, 40, 30, 20, 10,
    0, 0, 0, 0, 0, 0, 0, 0,
    0, 0, 0, 0, 0, 0, 0, 0,
    0, 0, 0, 0, 0, 0, 0, 0,
    0, 0, 0, 0, 0, 0, 0, 0,
    0, 0, 0, 0, 0, 0, 0, 0,
    0, 0, 0, 0, 0, 0, 0, 0,
    0, 0, 0, 0, 0, 0, 0, 0,
    0, 0, 0, 0, 0, 0, 0, 0,
    0, 0, 0, 0, 0, 0, 0, 0,
};
```

Wavelets or extraction functions can be convoluted with signals from the X, Y, or Z movement directions. In other words, convolution can be used on the extraction function and one of the X, Y, or Z movement functions (represented by the data readings) to produce a third function. The third function can be a modified version of one of the original functions.

Figure 7:
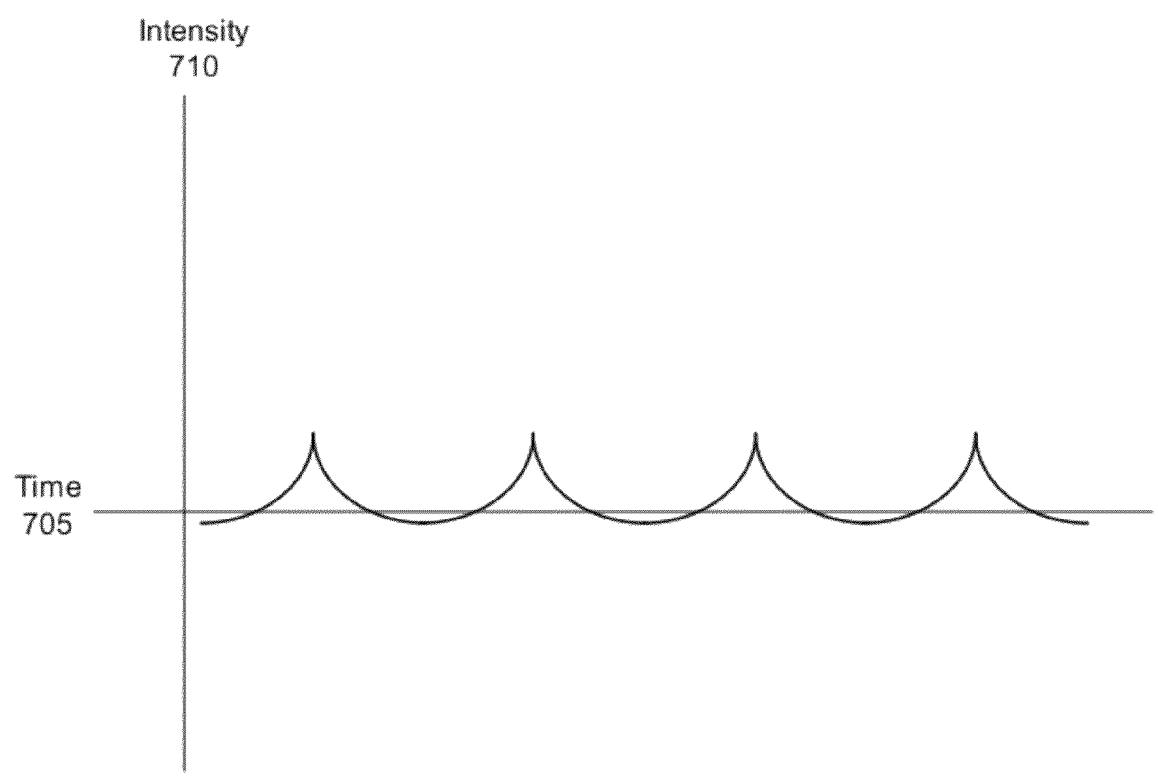
FIGS. 7-8 are graphs of convolutions of forward steps in accordance with examples of the present technology.

X direction signal extraction can be accomplished by convolving the X movement data with the extraction function. The convolution may result in a graph such as that depicted in FIG. 7. The horizontal axis 705 of FIG. 7 represents time and the vertical axis 710 represents intensity. Each time the person takes a step, the convolution will appear as a spike.

Figure 8:
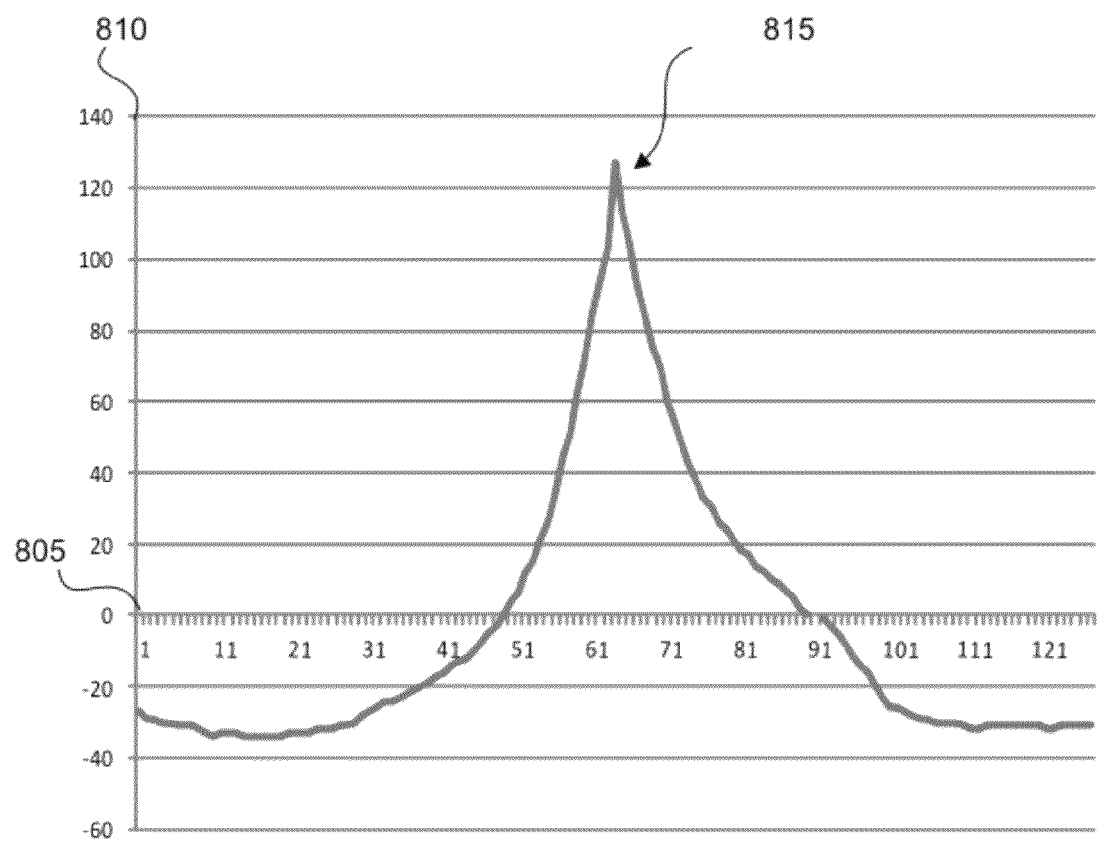

FIG. 8 is a convolution from the experimentally derived wavelet 625 of FIG. 6a. The horizontal axis 805 of FIG. 8 represents time and the vertical axis 810 represents intensity. The spike-like appearance 815 of the convolution is representative of a step by a person. This convolution is a foot fall detector. The foot fall detector can be represented by the following code snippet:

```
// The foot fall detector. A sharp peak. This is a primary step detector
// that can be used to align other detectors.
const int peakForm[BM_TABLE_SIZE] = {
    -27, -29, -29, -30, -30, -31, -31, -31,
    -32, -33, -34, -33, -33, -33, -34, -34,
    -34, -34, -34, -34, -33, -33, -33, -33,
    -32, -32, -32, -31, -31, -30, -28, -27,
    -26, -24, -24, -23, -22, -21, -20, -19,
    -17, -16, -14, -13, -12, -10, -8, -5,
    -3, 0, 4, 6, 12, 15, 21, 27,
    35, 45, 51, 63, 72, 84, 95, 103,
    127, 113, 104, 93, 85, 75, 70, 60,
    54, 48, 42, 38, 33, 30, 26, 24,
    21, 18, 17, 14, 12, 10, 9, 7,
    5, 2, 0, -1, -3, -5, -8, -11,
    -14, -16, -20, -23, -26, -26, -27, -28,
    -29, -29, -30, -30, -30, -30, -31, -32,
    -32, -31, -31, -31, -31, -31, -31, -31,
    -31, -32, -32, -31, -31, -31, -31, -31
};
```

Note that the functions described above may be functions defined for a particular set of hardware. Even for the particular hardware some changes can be incorporated into the definition of the detectors without serious changes in the function.

As described above, data received for steps taken by the user may appear as a series of spikes on a convolution graph. These spikes can provide the following exemplary information:

1. An indication of step speed. The distance between spikes can be used to calculate the stride speed or time between steps. This result can be noisy and in some cases may include closely spaced spikes. When spikes are too closely spaced there is a physical limitation that the user may simply be unable to take steps at such a pace. To correct for the noise, where several peaks occur within a predetermined time period the spikes or peaks can be treated as one spike. In one example, a predetermined time window can be established of about ¼ seconds. The highest peak and/or intensity estimate within the time window can be selected and identified as the step. In one example, the step detection window is ¼ second after the peak with a 64/200$^{th}$ second total window.

Figure 9:
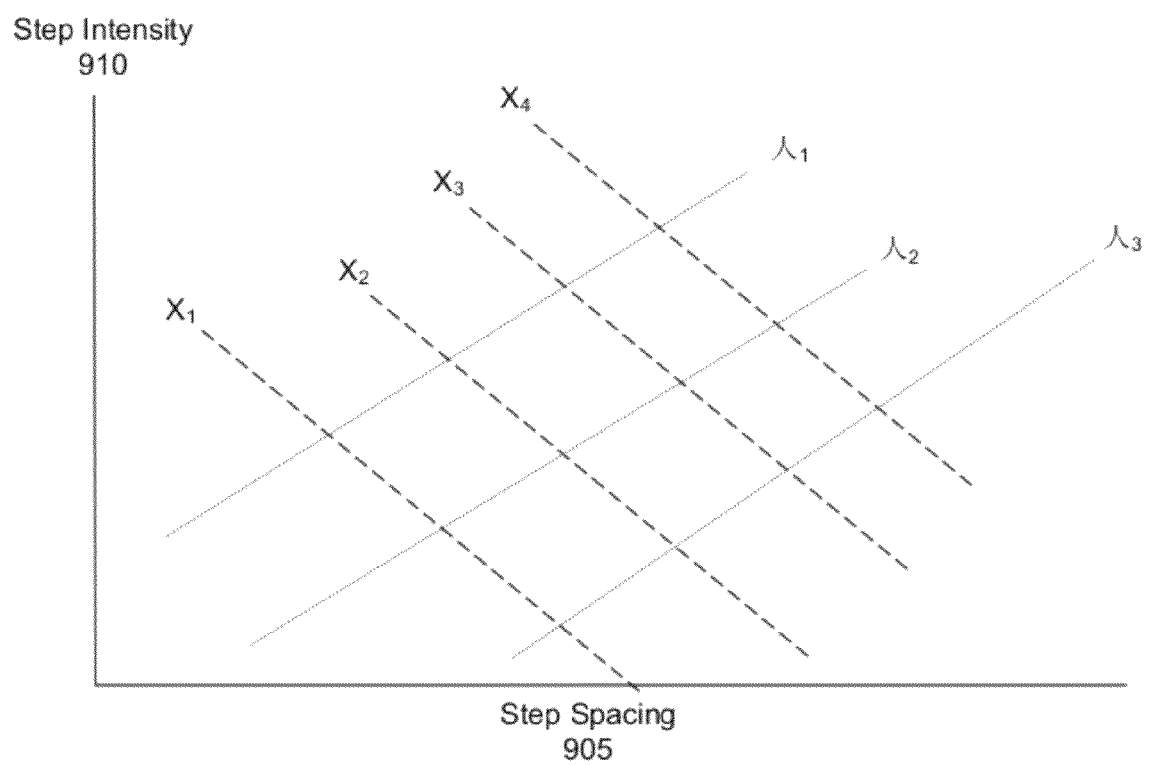
FIG. 9 is a chart for mapping of step intensity and spacing for different individuals in accordance with an example of the present technology.

2. The spike height provides a measure of step intensity. Faster walking and running will produce higher spike heights while slow walking will produce smaller spikes. These characteristics can be combined to provide additional information about stride length, as demonstrated in the graph in FIG. 9. The dotted lines represent different individuals $\lambda_1$, $\lambda_2$, and $\lambda_3$. The step spacing (represented as the horizontal axis 905) and step intensity (represented as the vertical axis 910) are related. The dashed lines represent a multiplicative factor $X_1$, $X_2$, $X_3$, $X_4$ for the step length. The multiplicative factors typically range from about 0.2 to 2.0 times the standard stride length for a particular user. The exact shape and layout of this figure can be dependent on hardware and user considerations and can be derived experimentally. Also, a different graph can be used for forward steps, backward steps, sideward steps, etc. Thus, each individual can have a personalized step intensity, stride length, multiplicative factor, and other information which can be used to track step size variation and to estimate a position of the individual.

3. The spikes may be inverted (e.g., the spike can be negative (down) rather than positive (up)), which can indicate a backward step, or that the person is walking backwards.

4. The spikes can provide an indication of stride length. For example, more closely spaced spikes can represent faster-paced strides. Typically faster strides are longer than shorter strides. Thus, stride length calculations can be adjusted based on stride speed or intensity.

In some examples, smoothing peaks of the wavelets for footfall detection, direction detection, etc. can assist in detection discrimination. In other words, a clearer result can be obtained using wavelets having artificially smoothed peaks.

A convolution can be performed for the Z (left/right) direction to obtain additional information. The Z convolution can enable detection and adjustment for side steps. Side steps (as convoluted) may appear as a series of maximum and minimum points in a graph. If the difference in the magnitude of the maximum and minimum is zero, there is usually no side step. If the magnitudes are not equal there may be a degree of sidestepping. An amount of size of side step can be deduced from the difference in magnitude. Experimentally, side steps below a 2:1 ratio generally have no effect on the detection of side steps, whereas side steps above a 2:1 ratio do. Desired cutoff points and sidestep magnitudes can be determined experimentally.

Figure 10A:
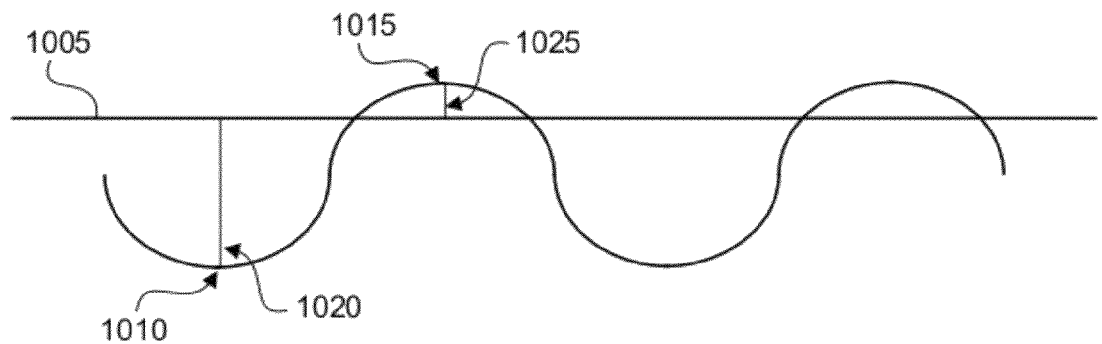
FIGS. 10a-10b include graphs representing left and right sidestepping convolutions in accordance with examples of the present technology.
Figure 10B:
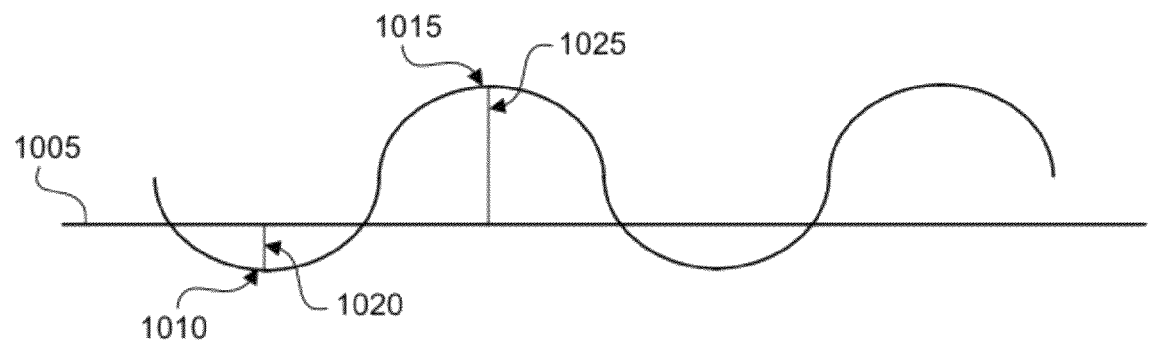

Referring to FIGS. 10a-10b, graphs are shown illustrating side stepping convolutions. In the FIG. 10a graph, the magnitudes 1020 of the valleys 1010 below the axis 1005 are much greater than the magnitude 1025 of the peaks 1015 above the axis and thus may indicate side stepping. Such a convolution may represent a side step to the left. In the FIG. 10b graph, a convolution is shown with the peak 1015 magnitude 1025 much greater than the valley 1010 magnitude 1020, which may represent a side step to the right. In other words, the direction of the asymmetry provides information about the direction of the sidestep.

When a person sidesteps to the left, for example, the first motion is to move the left foot away from the body. The first motion may appear as a sidestep as discussed above. The next step is typically moving the right foot next to the left foot. This next step may appear as a step rather than a sidestep. Sidestep measurements may include an alternating sequence of a sidestep followed by a step. Typically steps imply a movement in the X direction, which is not actually happening in the case of a side step (which is in the Z direction). As a result, each sidestep followed by a step will produce a phantom step movement in the X direction and introduce error into an estimated location of a person. To eliminate this issue, a step immediately following a sidestep can be ignored in the X direction. This solution can eliminate the phantom X direction stepping.

In a similar manner, descending a stair can produce a response that may be indistinguishable from a back step. A person may thus appear to be backing up while descending stairs. This issue can be corrected by simply turning off a back step routine when the person is descending a stair, as denoted by a change in elevation from the barometer.

A convolution in the Y, or up/down direction, can be used to fine-tune the detection of rapid changes in elevation.

A total magnitude (or energy E) of a signal from an accelerometer can be calculated as:

$$E=\sqrt{X^2+Y^2+Z^2}$$

The total magnitude can be used to estimate the mode of motion in which the person is moving. The mode of motion can be determined by looking at all values of E within a step. The largest value of E can be selected and used in analysis.

1. If E is very low the person is probably not walking.
2. At slightly higher levels of E the person is probably walking slowly.
3. At very high levels of E the person is probably running.

Thus information about step length can be derived or correlated to magnitude values. This list of analyses of E values is not exhaustive and several motion modes can be generated from various E values. The total magnitude of energy may be at least partially dependent on a hardware layout and sensor selection. Thus, translation of the value across different platforms may be difficult.

Figure 11:
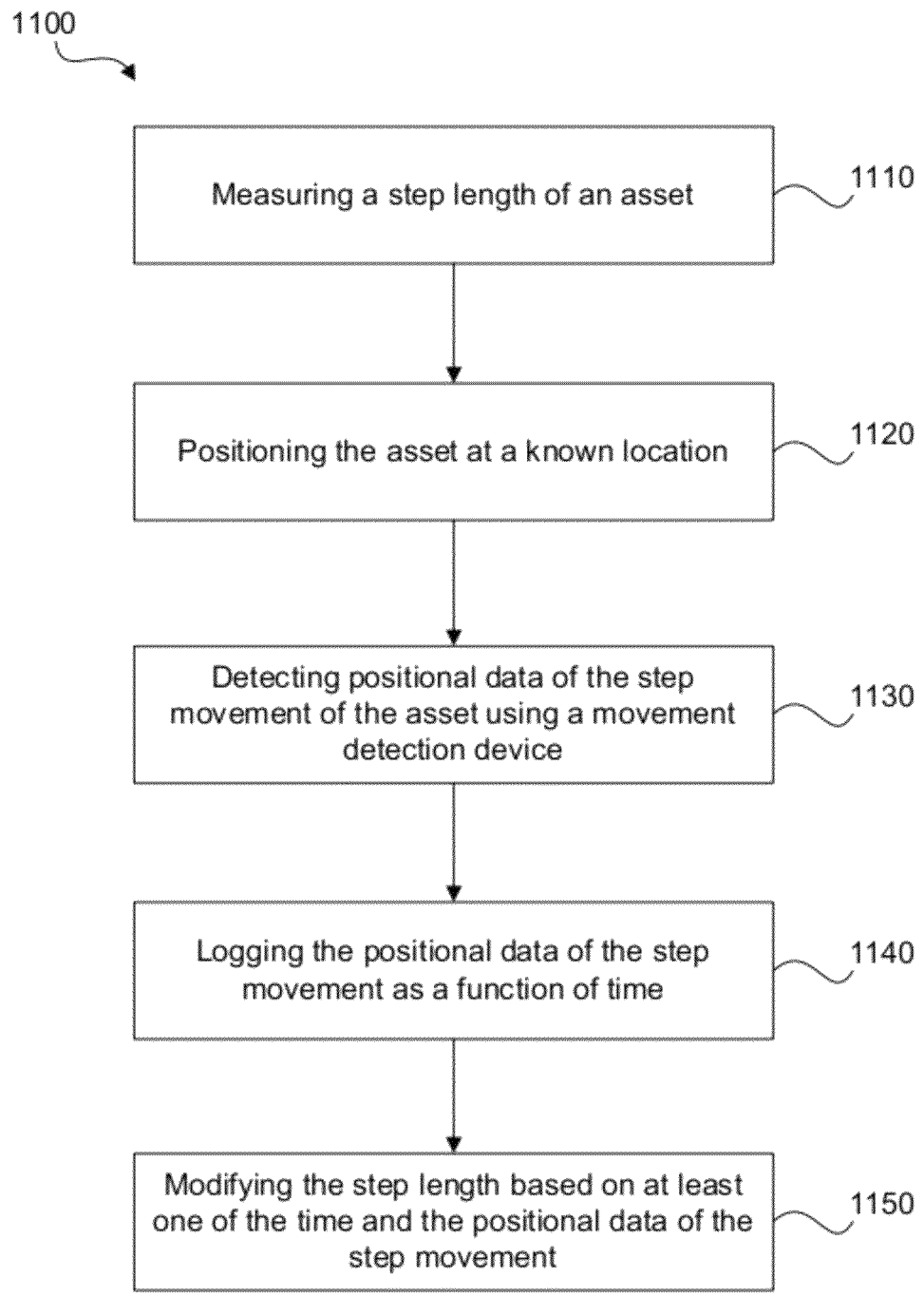
FIG. 11 is a flow diagram of a method for variable step tracking in accordance with an example of the present technology.

Referring now to FIG. 11, a flow diagram of a method for variable step tracking is illustrated in accordance with an example. The method can include measuring 1110 a step length of an asset. This measured step length can be stored in a database. The method can further include positioning 1120 the asset at a known location. The known location can be identified visually, topographically, electronically, or through any other suitable identification and/or communication method, using any suitable device (such as GPS, for example). In one aspect step movement of the asset can be calibrated with respect to the known location. From that known location, as the asset moves, positional data of the step movement of the asset can be detected 1130 using a movement detection device. The positional data of the step movement can be logged 1140 to memory or to the database as a function of time. The step length can be modified 1150 based on at least one of the time and the positional data of the step movement.

The method 1100 can include estimating an asset position with respect to the known location based on cumulative step lengths. The method can also include determining whether the step movement is a side step, and ignoring a subsequent step movement when: the subsequent step movement is in an opposite direction and is a low impact step movement. As has been described above, the method can also include identifying the step movements using a wavelet derived from compiled average data of a plurality of assets.

In one aspect, the positional data is detected as a plurality of dimensions of step movement and is detected in terms of at least an x-axis and a y-axis. The method can include switching the x-axis and the y-axis when the asset is crawling in order to correctly distinguish between vertical and horizontal movement. This step may be dependent on where the monitoring device is carried by the asset. For example, if the asset is worn around the torso of a person, the -axis and the y-axis may be switched when the person shifts between standing and crawling or prone positions.

The method can include reducing or eliminating back step detection when the asset is moving down stairs. The method can include increasing sensitivity to stair step detection if a previous asset movement was a step on a stair. The method can include disallowing backward step detection following a side step detection. The method can include measuring an energy of the movement of the asset and ignoring the movement if the energy is below a predetermined threshold.

The method can also include identifying an initial step of the asset using a reverse correlation of the change in at least one of the X, Y, and Z axes in normal walking step movement of the asset. In other words, when a user takes a first step, due to the differences in energy detected when a user pushes off from a still position into movement, the initial step can be detected as a backwards step, which is incorrect. Thus, the initial step can be detected using a reverse correlation to correctly identify the step as forwards or backwards, and subsequent steps can be identified normally.

Figure 12:
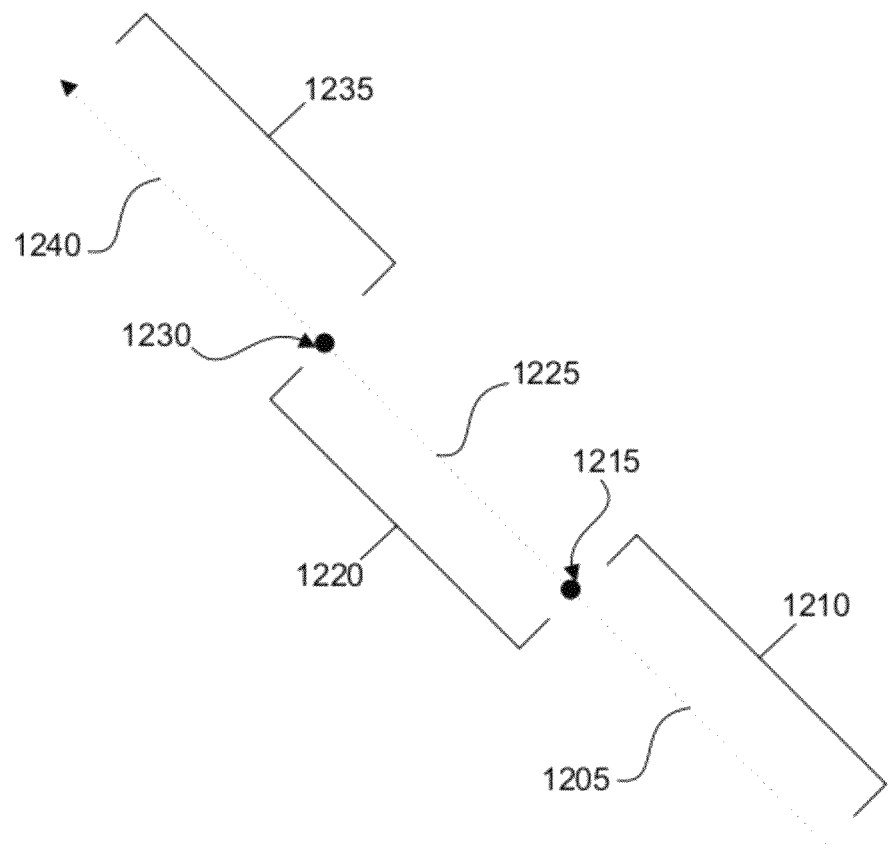
FIG. 12 illustrates a method of step tracking during a monitoring device reset in accordance with an example of the present technology.

Referring now to FIG. 12, the stabilization module described above (see discussion regarding FIG. 1) can operate to estimate an asset position with respect to a known location based on an average trajectory when the monitoring device, such as a gyroscope, resets and is temporarily unable to detect movement. An initial asset trajectory 1205 is shown. If the asset is moving quickly, such as by running, the motion can cause equipment, such as gyroscopes, to reset. A reset point is indicated as dot 1215. While the gyroscope is resetting, the gyroscope will not be functional for tracking or monitoring movement of the asset. Therefore, during the time 1220 that the gyroscope is unable to track the movement, an average trajectory 1205 from a time 1210 preceding the reset can be used to estimate a trajectory 1225 until the gyroscope resumes functionality, at 1230. Movement detected in a time 1235 following the resumption of functionality can have a trajectory 1240 which can correct any discrepancies from the estimated trajectory 1225.

The turn module described above can correct for inaccuracies in monitoring devices when the asset turns or changes direction of movement. Turn correction may comprise correcting the gyroscope using an output from a compass or magnetometer when the asset turns or changes direction. For example, with circular movement, a gyroscope may typically exhibit an error of approximately 1% or more over a 360° rotation. Thus, for every 360° rotation, the gyroscope may have an output approximately 3.6° off from a correct output.

If a person completes 8 complete rotations, the gyroscope may give an output approximately 25° off from the correct output. To minimize this error, the gyroscope output can be corrected based on a magnetometer output (such as a digital magnetic compass) at predetermined intervals during substantially straight asset movement and correcting the gyroscope output based on the magnetometer output at a shorter predetermined interval after a turn in asset movement, except when the asset is in a building.

Steel beams are commonly found in many buildings. If a magnetometer is used as a compass to, at least in part, detect movement and/or direction of the person within the building, the steel beams can lead to incorrect magnetometer output. For example, when the person is sufficiently distanced from the steel beams, the magnetic compass output correctly identifies North. However, the output becomes skewed as the person approaches the steel beams. In examples where the monitoring device includes a magnetic compass or magnetometer and a gyroscope, compensation for the incorrect output of the magnetic compass can be made by adjusting the received tracking data associated with the movement of the person based on the reading of the gyroscope. In other words, the stability of the gyroscope with respect to the magnetic attraction of the steel beams can be used to correct the magnetic drift and provide more accurate tracking capabilities. For this reason, turn correction within a building may typically be avoided to prevent mis-calibrations of the gyroscope due to magnetic drift caused by metallic beams within the building.

In other examples, magnetic drift can be compensated for without the use of a gyroscope or other movement detection device. For example, where movement is tracked using a magnetic compass near a wall having steel beams or any other structure which may cause magnetic drift, an average output of the compass can be used to determine an approximately correct magnetic output of the received tracking data. Also, compass output can be ignored when the person is not moving. Alternatively, the output of the compass can be determined to be steady using the data received from the gyroscope when the person is not moving.

Gyroscopes have a 'zero point', which is an angular rate sensed when the gyroscope is not moving. Over a number of days this zero point can drift enough to effect path accuracy. Automatic gyroscope zero point determination can be used to reduce the long term drift of gyroscopes on a day-by-day time period. The automatic gyroscope zero point determination can be performed by taking the average difference between the what the gyroscopes indicates is north and. what the compass indicates is north, and over a very long period (such as several hours, for example) adjusting the gyroscope zero drift calibration.

In one aspect, a system or method can eliminate effects of fidgeting of the asset. For example, if a person is rocking from foot to foot, side to side, steps may be detected, but to count the steps as movement and estimate changes in position based on the steps would lead to inaccuracies. Thus, an energy threshold may be provided. When a step energy meets or exceeds the threshold, the step can be counted as a movement and position change estimated. However, when the energy is less than the threshold, the movement can be ignored or simply counted as fidgeting without actual movement or change in position.

In some situations, a barometer may be used to detect elevation of the asset as well as changes in elevation of the asset. However, various circumstances can cause changes in barometric pressure, which could be incorrectly interpreted as a change in elevation of the asset. Some example circumstances include a weather pattern change or an explosion within a building. To accurately identify whether a change in elevation of the asset is actually occurring, a barometric pressure standard can be established using a base barometer. The base barometer can be positioned in an area that will detect any changes in pressure also detected by an asset barometer. A vertical position of the asset can be detected using an asset barometer, such as inside a building. The vertical position of an asset can be calculated relative to the base barometer. When a change in barometric pressure occurs that is not due to the actual movement of the asset, both the base barometer and the asset barometer will detect the change. Instead of showing a dramatic change in elevation of the asset, as would be the case without the base barometer, the vertical position of the asset can be corrected for the variations in barometric pressure using the barometric pressure standard.

Figure 13:
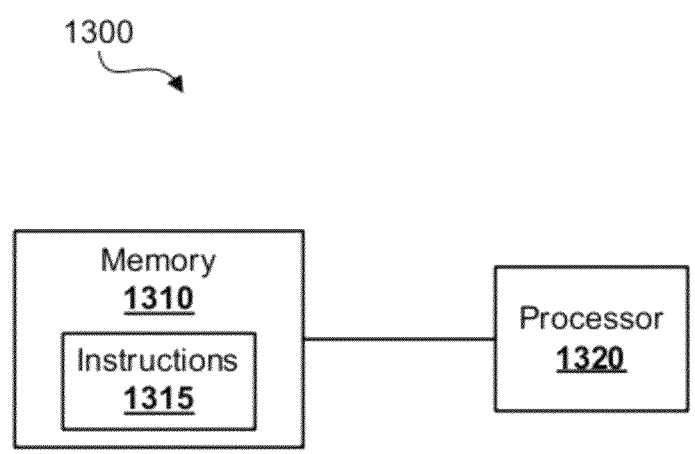
FIG. 13 is a block diagram of a system for variable step tracking in accordance with an example of the present technology.

Referring now to FIG. 13, a system 1300 and/or method can be implemented using a memory 1310, processor 1320, and/or computer readable medium. For example, an article of manufacture can include a memory or computer usable storage medium having computer readable program code or instructions 1315 embodied therein for validating an object and comprising computer readable program code capable of performing the operations of the methods described. In another example, the memory can include portable memory containing installation files from which software can be installed or remote memory from which installation filed can be downloaded. Also, program instructions stored in the memory can be embodied in installation files or installed files. The technology described in the foregoing examples can be used for variable step tracking and as a result can improve the accuracy of tracking systems.

The computer readable program code or instructions 1315, when executed by the processor, can be operable to perform various operations such as: measuring a step length of an asset; positioning the asset at a known location; detecting positional data of the step movement of the asset using a movement detection device; logging the positional data of the step movement as a function of time; and modifying the step length based on at least one of the time and the positional data of the step movement.

The described step tracking can be used to track or estimate a position of a person, typically where GPS or other continuous monitoring solutions are insufficient. In one example application, being able to track one or more individuals can enable a fire department to view an accurate location of a fireman within a burning building to know where to look if the fireman becomes trapped. As another application, a scene commander for a SWAT team can see where each member of the team is, as represented by a display showing both a building or other site that is overlaid on a position of each team member and give instructions to the team based on the various displayed positions. Typically, the step tracking can begin from a known position and be tracked from that position to estimate a current position.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Furthermore, the described features, structures, or characteristics may be combined in any suitable manner in one or more embodiments. In the preceding description, numerous specific details were provided, such as examples of various configurations to provide a thorough understanding of embodiments of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

The invention claimed is:

1. A variable step tracking system, comprising:
  a monitoring station operable to receive data signals representative of step movement of an asset as detected by a monitoring device carried by the asset;
  a step length database for storing a step length of the asset;
  a step length modification device for modifying the step length based on at least one of energy, asset orientation, direction, and frequency associated with the step movement; and
  a processor in the step length modification device for estimating an asset position with respect to a known location based on cumulative step lengths, the processor being further configured to use a wavelet to identify the step movement of the asset or to identify the at least one of energy, asset orientation, direction, and frequency associated with the step movement;
  wherein:

the wavelet comprises a first amplitude, a second amplitude, and a third amplitude, the second amplitude being a negative amplitude less than the first amplitude and the third amplitude being a greater amplitude than the first amplitude, the wavelet comprising a first declined portion declining from the first amplitude to the second amplitude, a inclined portion inclining from the second amplitude to the third amplitude, and a second declined portion declining from the third amplitude toward the first amplitude;

the processor is configured to smooth peaks of the wavelet to assist in detection discrimination of a change in a direction of motion caused by a step movement of the asset; and the change in direction is a change in direction from one direction selected from forward, backward or sideward directions to a different direction selected from forward, backward or sideward directions.

2. The system of claim 1, wherein the first and second declined portions and the inclined portion respectively comprise straight, linear segments.

3. The system of claim 1, wherein the first and second declined portions and the inclined portion comprise non-straight segments.

4. The system of claim 1, wherein if at least one movement detection device resets and is temporarily unable to detect movement, the processor estimates an asset position with respect to a known location based on an average trajectory.

5. The system of claim 1, wherein the database further stores an energy level associated with the step movement of the asset, wherein an average energy level is derived from a brisk walk energy level that is representative of at least one type of movement comprising at least one of walking, running, and crawling of the asset.

6. The system of claim 5, wherein at least one movement detection device detects the energy level associated with the step movement of the asset and the processor estimates an asset position based on the at least one type of movement.

7. The system of claim 6, wherein the at least one movement detection device is comprised of at least one accelerometer, gyroscope, barometer, altimeter, and/or magnetometer.

8. A computing device that is configured to perform variable step tracking, comprising:
a processor,
a memory in electronic communication with the processor;
instructions stored in the memory, the instructions being executable by the processor to:
measure a step length of an asset;
position the asset at a known location;
detect step movement of the asset using a movement detection device;
log data of the step movement as a function of time;
modify the step length based on at least one of energy, asset orientation, direction, and frequency associated with the step movement;
identify the step movements using a wavelet derived from compiled average data of a plurality of assets; and
perform one or more of:
reducing back step detection sensitivity when the asset is moving down stairs; or
increasing sensitivity to stair step detection if a previous asset movement was a step on a stair.

9. A computing device in accordance with claim 8, further configured to estimate an asset position with respect to the known location based on cumulative step lengths.

10. A computing device in accordance with claim 8, further configured to determine whether the step movement is a side step, and ignoring a subsequent step movement when the subsequent step movement is in an opposite direction and is a relatively low impact step movement as determined by an energy of the step movement.

11. A computing device in accordance with claim 8, further configured to calibrate step movement of the asset with respect to the known location.

12. A computing device in accordance with claim 8, wherein the wavelet comprises a first amplitude, a second amplitude, and a third amplitude, the second amplitude being a negative amplitude less than the first amplitude and the third amplitude being a greater amplitude than the first amplitude, the wavelet comprising a first inclined portion inclining from the first amplitude to the second amplitude, a declined portion declining from the second amplitude to the third amplitude, and a second inclined portion rising from the third amplitude to the first amplitude.

13. A device in accordance with claim 8, wherein positional data of the step movement is detected in terms of at least an x-axis and a y-axis, the computing device being further configured to switch the x-axis and the y-axis when the asset is crawling.

14. A computing device in accordance with claim 8, further configured to reduce back step detection sensitivity when the asset is moving down stairs.

15. A computing device in accordance with claim 8, further configured to backward step detection following a side step detection.

16. A computing device in accordance with claim 8, wherein the movement detection device comprises a gyroscope and a magnetometer, the computing device being further configured to correct a gyroscope output based on a magnetometer output at predetermined intervals during substantially straight asset movement.

17. A computing device in accordance with claim 16, further configured to correct the gyroscope output based on a magnetometer output at a shorter predetermined interval after a turn in asset movement, except when the asset is in a building.

18. A comuputing device in accordance with claim 8, further configured to increase sensitivity to stair step detection if a previous asset movement was a step on a stair.

19. A computing device in accordance with claim 8, further configured to measure an energy of the movement of the asset and ignoring the movement if the energy is below a predetermined threshold.

20. A computing device in accordance with claim 8, further configured to:
establish a barometric pressure standard using a base barometer;
identify a vertical position of the asset using an asset barometer; and
correct the vertical position of the asset for variations in barometric pressure using the barometric pressure standard.

21. A computing device in accordance with claim 8, further configured to identify an initial step of the asset using a reverse correlation of a plurality of dimensions of normal walking step movement of the asset.

22. A variable step tracking computing device, comprising:
a processor,
a memory in electronic communication with the processor;
instructions stored in the memory, the instructions being executable by the processor to:
measure a step length of an asset;

position the asset at a known location;
detect step movement of the asset using a movement detection device;
log data of the step movement as a function of time;
modify the step length based on at least one of energy, asset orientation, direction, and frequency associated with the step movement; and
perform one or more of:
  measuring an energy of the movement of the asset and ignoring the movement if the energy is below a predetermined threshold;
  disallowing backward step detection following a side step detection; or
  identifying an initial step of the asset using a reverse correlation of a plurality of dimensions of normal walking step movement of the asset;
wherein detection of the step movement of the asset uses a wavelet derived from compiled average data of a plurality of assets.

* * * * *